United States Patent [19]

Sengupta

[11] Patent Number: 5,750,630
[45] Date of Patent: May 12, 1998

US005750630A

[54] WATER-BASED POLYURETHANE POLYMER, RELEASE COATING, ADHESIVE TAPE AND PROCESS OF PREPARATION

[75] Inventor: Ashok Sengupta, London, Canada

[73] Assignee: Minnesota Mining and Manufacturing Company, St. Paul, Minn.

[21] Appl. No.: 676,334

[22] PCT Filed: Jan. 13, 1995

[86] PCT No.: PCT/US95/00528

§ 371 Date: Jul. 19, 1996

§ 102(e) Date: Jul. 19, 1996

[87] PCT Pub. No.: WO95/21206

PCT Pub. Date: Aug. 10, 1995

[30] Foreign Application Priority Data

Feb. 4, 1994 [CA] Canada ..................... 2115002

[51] Int. Cl.[6] ............ C08G 18/12; C08G 18/61
[52] U.S. Cl. .................. 528/59; 524/457; 528/52; 528/61; 528/75; 528/76; 528/80; 528/83; 528/85

[58] Field of Search ..................... 521/159, 170; 528/52, 59, 61, 65, 66, 75, 76, 77, 80, 83, 85; 524/457

[56] References Cited

U.S. PATENT DOCUMENTS

| 4,287,109 | 9/1981 | Schlak et al. |
| 5,356,706 | 10/1994 | Shores . |
| 5,543,171 | 8/1996 | Shores . |

FOREIGN PATENT DOCUMENTS

| 0 342 826 A2 | 11/1989 | European Pat. Off. . |
| 0 380 236 A2 | 8/1990 | European Pat. Off. . |
| 0 606 532 A1 | 7/1994 | European Pat. Off. . |
| WO 95/21206 | 8/1995 | European Pat. Off. . |
| 3730780 A1 | 3/1989 | Germany . |
| 1128642 | 9/1968 | United Kingdom . |

*Primary Examiner*—John M. Cooney, Jr.

[57] ABSTRACT

The invention relates to novel water-soluble or water-dispersible polyurethane compounds and to compositions that contain the novel compounds and are useful, for instance, as low adhesion backsize for adhesive tapes. The invention also relates to processes for preparing the novel compounds, compositions and tapes.

27 Claims, No Drawings

5,750,630

WATER-BASED POLYURETHANE POLYMER, RELEASE COATING, ADHESIVE TAPE AND PROCESS OF PREPARATION

TECHNICAL FIELD

The invention relates to novel water-soluble or water-dispersible polyurethane compounds and to compositions that contain the novel compounds and are useful, for instance, as low adhesion backsize for adhesive tapes. The invention also relates to processes for preparing the novel compounds, compositions and tapes.

BACKGROUND

A pressure-sensitive adhesive tape is essentially a pressure-sensitive adhesive coated on a flexible substrate backing. The tapes are usually stored in rolls in which each successive adhesive layer is in contact with the backing of the underlying layer. If the adhesive is a tackified block copolymer and there is too much adhesion between the adhesive layer and the backing, when the tape is unrolled for use the adhesive layer may stick to the backing and delaminate or separate from the adhesive side of the tape.

To prevent such delamination, and for ease of unwinding, the non-adhesive side of the tape i.e., the flexible substrate backing, is usually coated with a low adhesion backsize. A low adhesion backsize needs a balance of various properties to be effective. It should have flexibility and strength. The low adhesion backsize should adhere to, and form an even film on, the backing for even distribution of releasability. It should not contaminate the pressure-sensitive adhesive.

Polyurethanes that are known to be suitable for use as low adhesion backsize and inherently possess releasability have generally been soluble only in organic solvents. Since the low adhesion backsize is applied from solution, the use of organic solvent is necessitated, and after the low adhesion backsize has been applied to the tape backing the organic solvent must be removed and disposed of. Environmental considerations have led to a search for water-soluble, water-dispersible or water-borne compounds suitable for use as low adhesion backsize to eliminate or reduce the need for organic solvents.

DISCLOSURE OF THE INVENTION AND DETAILED DESCRIPTION

According to one aspect of the present invention there is provided a water-soluble or water-dispersible polyurethane polymer whose polymer chain includes segments derived from a silicone polycarbinol and whose polymer chain is end-capped with a silane.

To enhance the water-solubility or water-dispersibility of the polymer it is possible to include ethylene oxide moieties in the polymer chain. Although this enhances water-dispersibility, it renders the polymer moisture-sensitive, which is undesirable. It is therefore normally preferred to include few or no ethylene oxide units in those segments of the polymer chain that are not derived from the silicone polycarbinol. An alternative and preferred method of enhancing water-dispersibility is to include in the polymer chain a compound that bears a group that is water-soluble or can be rendered water-soluble. For example, if the compound 2,2-bis(hydroxymethyl)propionic acid is incorporated in the polymer chain carboxyl groups will be dependent from the polymer chain. If the polymer with the pendant carboxyl groups is reacted with a base, e.g., triethylamine, the carboxyl groups will be converted to carboxylate anions and will have a solubilizing effect. It will be appreciated that compounds bearing ionizable groups other than the carboxyl group can be used in a similar manner, with an appropriate acid or base to cause ionization to form a water-solubilizing anion or cation. Other compounds are discussed below.

According to another aspect of the present invention there is provided a water-soluble or water-dispersible polyurethane polymer which is the product of reaction between:
(i) an isocyanate-terminated polyurethane prepolymer
(ii) a low molecular weight polyamine chain extender, and
(iii) a mono-amine terminated silane chain terminator,
wherein the isocyanate-terminated prepolymer (i) is substantially free of urea linkages and is the product of reaction between:
(a) a polyether polyol or polyester polyol;
(b) a silicone polycarbinol; and
(c) a polyisocyanate.

It is noted that the higher the amount of silicone polycarbinol present, the better the release properties obtained. Similarly, the larger the quantity of silane chain terminating agent, in conjunction with the silicone polycarbinol the better the release properties. It is possible to tailor the release properties of the polymer by varying the amounts of silicone polycarbinol and silane chain terminating agent present, higher amounts leading to enhanced release properties. Normally the silicone polycarbinol will constitute from about 10% to about 50% by weight of the isocyanate-terminated urethane prepolymer. The silane chain terminating agent will constitute from about 1 to 5% by weight, preferably about 2 to 4% by weight of the isocyanate-terminated urethane prepolymer used to form the final polymer.

It is sometimes preferred to incorporate a low molecular weight diol chain extender in the isocyanate-terminated urethane prepolymer. The above-mentioned 2,2-bis(hydroxymethyl)propionic acid can perform two functions, serving as a chain extender and as a source of water-solubilizing carboxylate anions. A preferred diol chain extender that serves only a chain extending function is 1,4-butanediol.

By way of illustration, in the isocyanate-terminated prepolymer (i) a possible polyisocyanate is isophorone diisocyanate, a possible low molecular weight polyol chain extender is 1,4-butanediol, a possible polyester polyol or polyether polyol is polycaprolactone diol and a possible isocyanate-reactive water-solubilizing compound is 2,2-bis(hydroxymethyl) propionic acid. When these and the silicone polycarbinol are reacted there is used an excess of the isocyanate. When this reaction takes place there is formed a polyurethane in which segments derived from the isophorone diisocyanate alternate along the polymer backbone with segments derived from the various hydroxyl-containing compounds. As the polyisocyanate is present in excess, the polyurethane formed has isocyanate terminal groups, i.e., it is an isocyanate terminated prepolymer.

By way of further illustration the polyamine chain extender that is reacted with the isocyanate-terminated prepolymer (i) may be ethylene diamine and the monoamine terminated silane chain extender may be gamma-aminopropyl triethoxy silane. When these react with the isocyanate terminated prepolymer, urea linkages are formed between the isocyanate prepolymer and the ethylene diamine chain extenders so that prepolymer moieties and ethylene diamine segments alternate along the polymer. The polymer backbone is terminated by the gamma-aminopropyl triethoxy silane terminating agent, the amino group of which reacts with an isocyanate group to form a urea linkage, and the triethoxy silane group is located at the extreme ends of the polymer. In the case where the isocyanate-reactive, water-soluble compound is 2,2 bis(hydroxymethyl) propionic acid, there is added triethylamine which reacts with the carboxyl groups attached to the polymer backbone to convert them to ionic carboxylate groups and thereby enhance the water-solubility of the polymer.

According to a still further aspect of the present invention there is provided a process for preparing a water-dispersible or water-soluble polyurethane polymer which process comprises preparing an isocyanate-terminated prepolymer by, reacting together:

a) a polyether polyol or polyester polyol, b) a silicone polycarbinol, and c) a polyisocyanate, to form an isocyanate terminated prepolymer, and reacting the prepolymer so obtained in aqueous solution with:

a polyamine chain extender and an aminofunctional silane chain terminating agent.

In a preferred embodiment the water-soluble or water-dispersible polyurethane polymer is composed of 20 to 50%, more preferably 25 to 40%, by weight segments derived from a polyether polyol or polyester polyol, 30 to 45%, more preferably 35 to 40% by weight of segments derived from a low molecular weight chain extender and a polyisocyanate, from 10 to 50%, more preferably 25 to 35% by weight of segments derived from a silicone polycarbinol, and from 1 to 5%, preferably 2 to 4% of segments derived from a silane terminating agent.

Various segments of the polymer affect its final properties. Segments derived from the high molecular weight polyester or polyether polyols that result in a long distance between urethane groups or urea groups provide flexibility and adhesion, and may be referred to hereinafter as "soft segments". Segments derived from low molecular weight components such as the low molecular weight diol chain extender and the low molecular weight diamine chain extender result in only short distances between urethane or urea groups, and they may be referred to hereinafter as "hard segments". Segments derived from the silicone polycarbinol component enhance releasability. The water solubilizing segments facilitate dispersion or solubility in water.

However, there is some overlapping of properties. For example, a preferred water-solubilizing compound is 2,2-bis (hydroxymethyl) propionic acid and a preferred polyisocyanate is isophorone diisocyanate. The segments derived from both these compounds also function as hard segments in the polymer. A preferred silicone polycarbinol has a molecular weight of about 2,260 and segments derived from it also function as soft segments. The properties of the polymer may be altered by varying the nature and the amount of the various components used in forming the polymer.

Releasability is conventionally categorized into three levels: easy, or most releasable; medium; and premium, or least releasable. The appropriate releasability depends on the application and, to some extent, consumer preference. Premium levels, typically having releasability in the range of from 40 to 200 g/cm (as measured at 135° peel angle) are suitable for tapes such as diaper tapes. Generally a higher content of segments derived from the silicone polycarbinol will increase releasability i.e., will give a lower peel value in g/cm.

The molecular weight of the polymer of course depends on the molecular weight of the components used to prepare it. The molecular weight of the polymer is not found to be critical, but polymers having weight average molecular weights in the range of from about 20,000 to about 120,000 are found to be suitable.

In what follows, reference is made both to weight average molecular weights and number average molecular weight. Unless otherwise specified, however, molecular weights referred to are number average molecular weights.

To form the prepolymer, in a first stage a compound that provides water-solubilizing groups, a polyol, a chain extender, a polyisocyanate, a silicone polycarbinol and, where required, catalyst and solvent, are reacted. It is preferred that all the isocyanate-reactive groups in the first stage are hydroxyl groups. As all the hydroxyl groups present on the various compounds react at about the same rate with the isocyanate groups, segments derived from those compounds will alternate with segments derived from the diisocyanate and will be distributed randomly along the prepolymer backbone. There is thus formed an isocyanate-terminated urethane prepolymer that is free of any urea linkages.

Excessive branching tends to reduce water dispersibility or solubility. However, a mixture of difunctional reactants with a small quantity of trifunctional reactant, for example up to 10% of trifunctional reactant by weight of the prepolymer, is preferred. To form the branched polymer there can be used a small amount of a low molecular weight triol chain extender, for example trimethylolpropane.

Polyisocyantes

Any organic polyisocyanate, such as an aliphatic, cycloaliphatic, araliphatic or aromatic polyisocyanate, may be used either singly or in mixtures of two or more. Examples of useful cycloaliphatic polyisocyanates include dicyclohexylmethane diisocyanate (commercially available as Desmodur™W from Miles Coating Division), isophorone diisocyanate, 1,4-cyclohexane diisocyanate, 1,4-cyclohexanebis(methylene isocyanate), 1,3-bis (isocyanatomethyl)cyclohexane, and mixtures thereof Examples of useful aliphatic polyisocyanates include alpha, omega-alkylene diisocyanates having from 5 to 20 carbon atoms, for instance hexamethylene 1,6-diisocyanate, 1,12-dodecane diisocyanate, 2,2,4-trimethyl-hexamethylene diisocyanate, 2,4,4,-trimethyl-hexamethylene diisocyanate, 2-methyl-1,5-pentamethylene diisocyanate, dimeryl diisocyanate, and mixtures thereof. Examples of useful araliphatic polyisocyanates include m-tetramethyl xylylene diisocyanate, p-tetramethyl xylylene diisocyanate, 1,4-xylylene diisocyanate, 1,3-xylylene diisocyanate, and mixtures thereof. Preferred polyisocyanates, in general, include isophorone diisocyanate, dicyclohexylmethane 4,4'-diisocyanate, and mixtures thereof.

In general, aliphatic isocyanate groups react more quickly with primary amines than with water. In contrast, aromatic isocyanates display less difference in speed of reaction between primary amine and water. As the reaction with the primary amine is the desired reaction, this relative difference in reaction speed means that fewer undesired side reactions occur when using an aliphatic isocyanate. For this reason, aliphatic isocyanates are preferred.

Long Chain Polyol

The long chain polyol is preferably a polyester or polyether polyol and provides soft segments which give flexibility to the polymer. Diols are preferred. Mixtures may be used, and mixtures of a diol with a small amount of a triol may be used.

Illustrative polyols include the following classes of compounds:

(i) polyester polyols, including lactone polyols and the alkylene oxide adducts thereof;

(ii) polyether polyols, including polyoxyalkylene polyols, polyoxycycloalkylene polyols, polythioethers, and alkylene oxide adducts thereof; and (iii) specialty polyols including but not limited to polybutadiene polyols, hydrogenated polybutadiene polyols, polycarbonate polyols, hydroxy alkyl derivatives of bisphenol A such as bis(2-hydroxyethyl) bisphenol A, polythioether polyols, fluorinated polyether polyols, and acrylic polyols.

The term "alkylene oxide" includes, for example, ethylene oxide, 1,2-epoxypropane, 1,2-epoxybutane, 2,3-epoxybutane, isobutylene oxide, epichlorohydrin, mixtures thereof, and the like.

Polyester polyols are esterification products which can be prepared by the reaction of polycarboxylic acids, their anhydrides, their esters or their halides, with a stoichiometric excess of a polyol. The products range from liquids to non-crosslinked solids, i.e., solids which are soluble in many of the more common inert normally liquid organic media. Preferred polycarboxylic acids include dicarboxylic acids and tricarboxylic acids, such as maleic acid, succinic acid, glutaric acid, adipic acid, pimelic acid, suberic acid, azelaic acid, sebacic acid, chlorendic acid, 1,2,4-butanetricarboxylic acid, phthalic acid, terephthalic acid, and the like. Examples of useful polyols include polyglycol adipates, polyethylene terephthalate polyols, polycaprolactone polyols. A polycaprolactone triol can be used in small quantity. A preferred polycaprolactone diol is Tone 0230 (Union Carbide Co.). Another useful polyester polyol is Lexorez™ (Inolex Industrial Chemical Co.) e.g., Lexorez™ 1130–55 which is a linear long chain poly (1,6-hexane-diol adipate).

Tetra substituted hydroxypropyl ethylene diamine available under the trademark Quadrol™ from BASF can be used in small amount, i.e., as a minor component of the polyol. Other useful polyether polyols include grafted polyether polyols such as styrene/acrylonitrile grafted polyether polyols. Terathane™ 2000, which is a poly(tetramethylene ether glycol) of 1000 average equivalent weight available from DuPont, is another example of a suitable polyol.

Other variants, adducts, and derivatives of polyether polyols include fluorinated polyether polyols, and mixtures thereof.

The molecular weight of the long chain polyol component is a factor in determining the final properties of the polyurethane; generally, the higher the molecular weight of the polyol component, the softer the resulting polyurethane. If the molecular weight of the polyol is too high the resulting polymer may not be suitable as a low adhesion backsize composition. Long chain polyols having molecular weights of from 300 to 6000 are suitable, preferably 500 to 4000, more preferably 600 to 3000 and particularly 1000 to 2000. Mention is made particularly of polycaprolactone polyols having molecular weights of from about 800 to about 4000 and of polyester based on 1,6-hexanediol adipate having molecular weight of from about 1000 to 4000.

The selection of the long chain polyol depends on the backing material of the tape substrate. If the substrate is corona-treated or flame-treated polypropylene then crystalline or semi-crystalline long chain polyols are preferred, for example, those which are normally solid at room-temperature such as Lexorez 1130–55, Tone-0230 and Terathane-2000. Substrates of corona-treated or flame-treated polypropylene are used in diaper and box-sealing tape. For tapes using a cellulose or paper-based backing, amorphous long chain polyols would also be suitable.

Silicone Polycarbinol

The carbinol has silicone groups and non-hydrolyzable carbinol groups. Thus, the isocyanate-reactive hydroxyl groups are attached to a carbon atom, not a silicon atom. It is preferred that the silicone polycarbinols are diols. One group of suitable silicone diols is represented by the formula

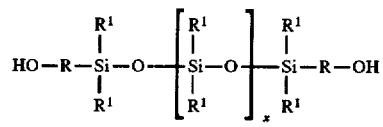

wherein R is a divalent group having at least three carbon atoms and up to about 60 atoms, in which the atom attached to the hydroxyl group is carbon. Examples of suitable divalent groups R include poly (alkyloxy) groups, preferably polyethylene oxide or polypropylene oxide groups, and polycaprolactone groups in each case having about 3 to about 14 repeating units. $R^1$ is lower alkyl, preferably methyl, or lower alkoxy, preferably methoxy, x is not more than 30 and is at least 2 or 3, more preferably at least 5 and most preferably about 15. One preferred silicone polycarbinol is Q4-3667 (Dow-Corning), which has a molecular weight of about 2,260 and in which x is 15, R is an alkoxy group of about 12 repeating alkoxy units and $R^1$ is methyl.

There should be sufficient silicone units to provide release and if there are many silicone units, or if R is too large, then the resulting prepolymer will be larger than desired. The preferred molecular weight of the silicone polycarbinol is from about 1,000 to about 5,000, more preferably about 2,000 to about 3,000, particularly about 2,100 to about 2,600.

The silicone polycarbinol is considered to form part of the total soft segments of the low adhesion backsize polymer. If the total soft segments represent about 60% by weight of the polymer, the proportion of silicone polycarbinol can range from 8% to 40%. The silicone polycarbinol is preferably not more than 50% by weight of the prepolymer.

Polyol Chain Extender

In the Isocyanate terminated prepolymer, it is preferred to use a polyol chain extender, preferably a diol. Polyol chain extenders are preferred so that the speed of reaction with isocyanate is of the same order as the speed of reaction of the long chain polyols with isocyanate. The chain extenders are low molecular weight compounds and should have a molecular weight of about 250 or less, preferably less than 200.

Useful diol chain extenders include 1,4-butanediol, ethylene glycol, diethylene glycol, dipropylene glycol, neopentyl glycol, 1,6-hexanediol, 1,4-cyclohexane dimethanol, bis(2-hydroxylethyl)hydroquinone, and mixtures thereof. 1,4-butanediol is a preferred polyol chain extender.

Water-solubilizing Groups

These groups are hydrophilic or ionic groups whose presence in the polymer assists solubility or dispersibility of the polymer in water and enhances the stability of polymer dispersions. Polyurethanes are generally hydrophobic and not water-dispersible. The water-solubilizing groups may be incorporated in the prepolymer in the first stage in an inactive form and activated in the second stage by a salt forming compound. Water-solubilizing groups include non-isocyanate reactive groups and may be anionic or cationic. Examples of suitable anionic groups are $-SO_3^{\ominus}M^{\oplus}$, $-OSO_3^{\ominus}M^{\oplus}$, $-CO_2^{\ominus}M^{\oplus}$, or $-PO(OM)_3$, wherein M may be H in the inactive form or a soluble cation such as sodium, potassium, calcium or $NR_3H^+$. Examples of suitable cationic groups are $-NH(R)_2^{\oplus}X^{\ominus}$or $-N(R)_3^{\oplus}X_{\ominus}$wherein X may be a soluble anion such as halide, hydroxide or carboxylate and R may be a phenyl group, cycloaliphatic group, or a straight or branched aliphatic group having from about 1 to about 12 carbon atoms. Preferably, R is a lower alkyl group of 1 to 4 carbon atoms.

With regard to the anionic group when M is H, reaction of the anionic group with isocyanate will not be significant if the acid group is sterically hindered, as in, e.g., the particularly preferred compound 2,2-bis(hydroxymethyl) propionic acid, also known as dimethylol propionic acid. The ratio of isocyanate groups to solubilizing groups is typically from about 4:1 to about 16:1, preferably about 5:1 to about 11:1.

It is preferred to incorporate such water-solubilizing groups into the prepolymer by means of a water-solubilizing compound, which also functions as a chain extender, and which may be added to the prepolymer-forming mixture in the first stage. The water-solubilizing compound may have the water-solubilizing group in an inactive or latent form. This is activated in the second, aqueous stage. For instance a carboxyl group is a latent water-solubilizing group that can be rendered active by salt-formation, for instance by reaction with a base such as triethylamine. The water-solubilizing compound preferably has hydroxyl groups as the isocyanate-reactive groups and is preferably a diol.

Solvents

In the first reaction stage to form the isocyanate-terminated prepolymer no solvent is required. A solvent may be desirable however to reduce the viscosity of the reaction mixture for easier mixing. Solvents may be any which are inert to isocyanate, but non-polar solvents are preferred. Examples of solvents include, N-methyl pyrrolidone, n-butyl acetate, dimethyl formamide, methoxypropanol acetate, diethylene glycol monoethyl acetate (DE acetate), ketones, alcohols, dimethyl acetamide, and mixtures thereof.

In the aqueous dispersion of the final product it is preferred to have a coalescing agent. If the polyurethane composition is to be used as a backsize composition a coalescing agent assists in formation of an even film when the composition is applied to the tape backing. A suitable coalescing agent evaporates more slowly than water and thus promotes even film formation. Conveniently a compound can be chosen to be the solvent in the first stage and to serve coalescing agent when the composition is applied to the tape. For example, N-methyl pyrrolidone is a solvent which can serve as a coalescing agent.

Whilst there are no special limits on the quantity of solvent to be used in the first reaction stage, the quantity used is conveniently calculated to obtain the desired quantity of coalescing agent or cosolvent in the final dispersion of the polymer. Use of N-methyl-pyrrolidone in an amount of from about 7 to 10% by weight of the mixture used to form the isocyanate-terminated urethane prepolymer is preferred. The amount of cosolvent in the final dispersion of the polymer is not normally more than about 2% and the amount of solid in the final dispersion is normally about 5 to about 10%.

Catalysts

The formation of the prepolymer in the first stage may be achieved without the use of a catalyst. However, use of a catalyst is preferred. Depending on reaction temperature and polyisocyanate used, a catalyst in an amount of up to about 0.5 parts by weight of the isocyanate-terminated prepolymer, typically about 0.005 to about 0.5 part by weight, may be used. Examples of useful catalysts include tin II and IV salts such as tin dilaurate and stannous octoate, for example T-9 (Air Products Co.), and tertiary amine compounds such as triethyl amine and bis (dimethylaminoethyl) ether, morpholine compounds such as $\beta,\beta'$-dimorpholinodiethyl ether, bismuth carboxylates, zinc-bismuth carboxylates, iron (III) chloride, potassium octoate, and potassium acetate. Examples of other useful catalysts can be found in Polyurethanes: Chemistry and Technology, Part I, Table 30, Chapter 4, Saunders and Frisch, Interscience Publishers, New York, 1963.

Polyamine Chain Extender

The isocyanate prepolymer is formed in the absence of moisture, although amounts up to 0.5% can be tolerated. Excessive amounts of water will cause undesirable side reactions. The isocyanate prepolymer is then further dispersed in water. Since the final chain extension is in water it is preferred to use as chain extender a compound which reacts with isocyanate much faster than water reacts with isocyanate. This minimizes reaction between the isocyanate and water. Thus fast reacting polyamine chain extenders, such as primary amines, are preferred in the second reaction stage. It is preferred that the reaction speed of the second stage reactants with the Isocyanate-terminated prepolymer is such that not more than about 10%, more preferably not more than 5%, of the isocyanate groups react with water.

Low molecular weight primary diamines are preferred. The polyamine chain extender has a molecular weight that is preferably less than 250, more preferably less than 200. Examples of useful diamine chain extenders include ethylene diamine, 4,4'-methylene bis(o-chloroaniline), 2,5-diethyl-2,4-toluene diamine, 4,4'-methylene bis(3-chloro-2, 6-diethylaniline), propylene glycol bis(4,4'-aminobenzoate), 3,5-di(thiomethyl)-2,4-toluene diamine, methylene bis(4,4'-aniline), ethyl-1,2-di(2-amino thiophenol), 4-chloro-3,4-diamino isobutylbenzoate, 1,2-diaminoethane, 1,4-diaminobutane, 1,6-diaminohexane, N,N'-dialkyl (methylene dianiline), N,N'-dialkyl(1,4-diaminobenzene), and mixtures thereof. Ethylene diamine is a preferred polyamine chain extender.

Chain Terminating Silane Compounds

In the second reaction stage the polymer product is formed by chain extension and chain termination. Chain termination is effected by a silane compound having a single isocyanate-reactive group. Silane compounds containing one or more hydrolyzable groups on the silicon atom and an organic group (including the isocyanate-reactive group) are most suitable. The presence of the hydrolyzable group promotes some cross-linking when, after the polymer dispersion has been applied to a tape backing, the water is removed (i.e., after drying). The alkoxy group is a preferred hydrolyzable group and particularly preferred compounds are those of the structure $(R^3O)_3Si-R^4-Z$, wherein $R^3$ is selected from the group consisting of lower alkyl groups of one to four carbon atoms, preferably one or two; lower acyl groups of 2 to 5 carbon atoms, preferably 2 or 3, and lower oxime groups of the formula $-N=CR^5R^6$ wherein $R^5$ and $R^6$ are monovalent lower alkyl groups which can be the same or different, selected from the group consisting of methyl, ethyl, propyl and butyl; $R^4$ is a divalent organic bridging group of 2 to about 20, preferably 3 to about 10 carbon atoms, selected from the group consisting of divalent hydrocarbyl groups free from olefinic unsaturation and free from isocyanate-reactive groups, divalent polyoxyalkylene mono- or poly-oxyalkylene groups containing not more than one ether oxygen per two carbon atoms, and divalent hydrocarbylamino groups, and Z is an isocyanate reactive group such as —OH, —SH, —NHR, —NH$_2$—N(C$_2$H$_4$OH)$_2$, or another active hydrogen terminated group, preferably an amine, wherein R is selected from the group consisting of phenyl, straight and branched aliphatic groups comprising from about 1 to about 12 carbon atoms, and cycloaliphatic groups having 3 to 8 carbon atoms.

Representative divalent alkylene groups include —CH$_2$CH$_2$—, —CH$_2$CH$_2$CH$_2$—, —CH$_2$CH$_2$CH$_2$OCH$_2$CH$_2$—, —CH$_2$CH$_2$CH$_2$NHCH$_2$CH$_2$—, and CH$_2$CH$_2$C$_6$H$_4$CH$_2$CH$_2$.

Other preferred silane compounds are those which contain one or two hydrolyzable groups, such as compounds having the structures

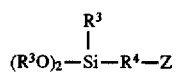

and

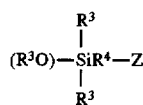

wherein $R^3$ and $R^4$ and Z are as previously defined.

These terminal silyl groups generally hydrolyse in aqueous solution and the polymers are curable by mutual inter-reaction to form siloxane linkages, e.g.,

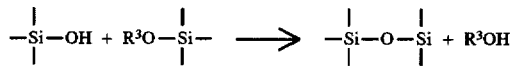

Such silicone compounds are well known in the art and many are commercially available or are readily prepared.

A preferred chain terminating compound within the scope of the invention is an omega-amino C$_{1-4}$ alkyl tri (C$_{1-4}$alkoxy) silane.

Representative isocyanate-reactive silane compounds include
H$_2$NCH$_2$CH$_2$CH$_2$Si(OC$_2$H$_5$)$_3$;
H$_2$NCH$_2$CH$_2$CH$_2$Si(OCH$_3$)$_3$;
HSCH$_2$CH$_2$CH$_2$Si(OCH$_3$)$_3$;

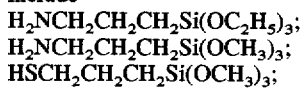

HS(CH$_2$H$_4$O)$_3$C$_2$H$_4$N(CH$_3$)(CH$_2$)$_3$ Si(OCH$_4$H$_9$)$_3$;
H$_2$NCH$_2$C$_6$H$_4$CH$_2$CH$_2$Si(OCH$_3$)$_3$;
HSCH$_2$CH$_2$CH$_2$Si(OCOCH$_3$)$_3$;
HN(CH$_3$)CH$_2$CH$_2$Si(OCH$_3$)$_3$;
HSCH$_2$CH$_2$CH$_2$SiCH$_3$(OCH$_3$)$_2$;
(H$_3$CO)$_3$ SiCH$_2$CH$_2$CH$_2$NHCH$_2$CH$_2$CH$_2$Si(OCH$_3$)$_3$ and mixtures thereof.

Gamma-aminopropyl triethoxy silane is a commercially available silane chain terminating agent available as A 1100, from (Union Carbide).

Releasability and adhesion can be controlled by varying the amount of silane terminating agent used in conjunction with the amount of silicone polycarbinol. For example, when using gamma-aminopropyl triethoxy silane it is preferred to use at least 1 gm agent per 100 gms of prepolymer.

Salt-forming Compounds

The salt-forming compound is selected having regard to the water-solubilizing compound used. Examples of useful salt-forming compounds include ammonia, trimethylamine, triethylamine, tripropylamine, triisopropylamine, tributylamine, triethanolamine, diethanolamine, and mixtures thereof. Triethylamine is a preferred salt-forming compound.

It is preferred to use sufficient salt-forming compound to convert all of the water-solubilizing groups to the active or ionic form.

Other Additives

Other compounds may be added to enhance or obtain particular properties, provided they do not interfere with the adhesive, film-forming and release properties of the low adhesion backsize polymer.

Particularly useful additives include defoaming agents such as Surfynol™ DF110 (a high molecular weight acetylenic glycol nonionic surfactant available from Air Products & Chemical, Inc.), SWS-211 (a silicone additive available from Wacker Silicone Corp.), Dehydran™ 1620 (a modified polyol/polysiloxane adduct available from Henkel Corp.), and DB-31 and Additone 65 (a silicone additive available from Dow Corning); flow and leveling agents such as Igepal™ CO-630 (an ethoxylated nonylphenol nonionic surfactant available from Phone-Poulenc Surfactant & Specialty Div.), Surfynol™ 104H (a nonionic surfactant comprising a solution of tetramethyl decynediol in ethylene glycol available from Air Products & Chemicals, Inc.) Surfynol™ 465 (an ethoxylated tetramethyl decynediol nonionic surfactant available from Air Products & Chemicals, Inc.), Fluorad™ FC-129 (an anionic surfactant available from 3M Co.), Fluorad FC-171 (a nonionic surfactant available from 3M Co.), Fluorad FC-430 (a nonionic surfactant available from 3M Co.) and Rexol™ 25/9 (an alkyl phenol ethoxylate nonionic surfactant available from Hart Chemical Ltd.); other defoamers such as Foamkill™ 649 (from Crucible Chemical Company), Witco defoamers such as 1840X and 1317A, and Troykyd 999 (Troy Chemicals Company Ltd.). Foamkill 649 is particularly preferred. Defoamers are suitably added after dispersion of the low adhesion backsize polymer.

For a tape substrate which is polypropylene, adhesion of the low adhesion backsize to the backing may be improved by addition of an adhesion promoter. Examples of adhesion promoters are chlorinated polyolefin dispersions such as CP347W or CP349W (from Eastman Chemical Company).

In a preferred procedure, to a reactor equipped with stirrer, heater and a dry nitrogen gas purge, polyisocyanate is added together with solvent. All the reactants in the first reaction stage should be kept dry to avoid unwanted side-reactions of isocyanate with water; preferably the moisture content should not exceed 0.05%, more preferably not more than 0.03%. The other first stage reactants are then added and the reaction temperature maintained at less than 80° C., preferably from 40 to 60° C., until the reaction is complete.

The reaction is usually complete after an hour to an hour and a half. The completion of the reaction can be determined by titrimetrically measuring the isocyanate groups remaining. When the quantity of remaining isocyanate groups matches the calculated theoretical remainder after reaction with all available hydroxyl groups (the isocyanate-reactive groups), the reaction is complete and the prepolymer obtained is ready for the second reaction stage. It is preferred that the viscosity of the solution containing the prepolymer is low enough to facilitate dispersion of the prepolymer in the second stage. Solvent can be added to lower the viscosity.

The ratio of isocyanate groups to the total available isocyanate-reactive hydroxyl groups (NCO:OH) in the first reaction stage is preferably close to the theoretical ratio of 2:1 to form a diisocyanate prepolymer, for example from 1.8 to 2:1, or even 1.95:1, but can range from as low as 1.4:1 to as high as 5:1.

It is preferred that the weight average molecular weight of the prepolymer is in the range from about 4,000 to about 8,000, preferably from about 7,000 to about 8,000. It is desirable that the prepolymer is readily dispersible in water.

The second reaction stage is the aqueous stage and it is, of course, preferred to use deionized or distilled water to avoid unwanted electrolytes which may destabilize the dispersion. The prepolymer obtained from the first stage is added slowly to an aqueous solution of the second stage reactants. The second stage is suitably effected using a homogenizer, such as an "Omni" mixer, with stirring at medium to high shear to assist dispersion.

The quantity of water is selected in relation to the total quantity of prepolymer, to obtain an initial dispersion of from 28 to 30% solids, for example, 175 g of prepolymer in 450 g of water. As the solids content increases above 30%, shelf life of the dispersion tends to decrease because excess hydrogen bonding destabilizes the dispersion.

If the total of the hard segments is about 40% by weight of the total polymer, then the total of the chain extenders can range from 4% to 15% by weight with the remaining 36% to 25% being derived from polyisocyanate. It is preferred that the total hard segments, including isocyanate derived segments and chain extenders, represents about 40% by weight of the low adhesion backsize polymer, for example from 30% to 45% by weight.

If it is to form a low-adhesion backsize, the aqueous polymer dispersion so obtained is further diluted with water to about 2.5 to 30% solids content, preferably from 2.5 to 10% solids content.

As mentioned previously, it is desirable that the dispersion of polymer product contain a small amount of coalescing agent. For a dispersion having 10% solids content, there should be no more than 5% of coalescing agent by weight of the dispersion, preferably from 0.5 to 2%. The coalescing agent is conveniently the same as the organic solvent used in the first stage.

N-methyl pyrrolidone is a preferred first stage solvent and subsequently a coalescing agent. Thus the quantity of solvent used in the first stage can conveniently be the quantity desired in the dispersion of the polymer product, without further additions.

The pH of the dispersion is usually not a concern. When the water solubilizing group is carboxylate anion and the salt forming compound is triethylamine, a pH of 8 gives satisfactory shelf-stability.

The polymers are suitable, for example, for use as a low-adhesion backsize on the backing of diaper tapes, surgical tapes, tapes which use polyester backing such as household transparent tape, box sealing tapes or masking tapes. For a diaper tape or a box sealing tape a corona-treated or flame-treated biaxially oriented polypropylene, especially freshly treated, is preferred.

The invention will be further illustrated by the following non-limiting examples.

EXAMPLES 1 to 6

Example 1

(using polycaprolactone polyol as the sole polyester or polyether polyol)
Prepolymer Preparation:

A prepolymer was first made in a 500 ml reaction glass flask equipped with a heating mantle, condenser, stirring blade, nitrogen inlet/outlet and a thermometer. In the reaction flask 155.4 gms of the polycaprolactone diol Tone - 0230 (0.249 eq) from Union Carbide, 22.26 gms of 2,2-bis (hydroxymethyl) propionic acid (0.332 eq), 2.69 gms of 1,4-butanediol, (0.0597 eq), 147 gms of isophorone diisocyanate (1.3183 eq) from Huls Chemicals, 42.0 gms of N-methyl pyrrolidone, 0.04 grams of T-9 (a stannous octanoate catalyst) and, as a release component, 58.809 grams of the silicone polycarbinol Q4-3667 (0.0520 eq) from Dow Corning Company was added. The mixture was reacted at 80° C. for about 1 hour 45 minutes to 2 hours till the experimental NCO matched with calculated values. The experimental value was measured by titration with dibutylamine and HCl containing an indicator solution. The prepolymer was found to have an equivalent weight of 684.9, and NCO:OH ratio of 1.9:1.

Dispersion Preparation:

175 grams of the prepolymer obtained was added slowly, while stirring, to a premixed solution of 450 grams of water, 6.79 grams of triethylamine, 6.29 grams of ethylenediamine, and 4.55 grams of silane A1 100 (gamma-aminopropyltriethoxysilane, from Union Carbide). The solution was stirred for another hour and the dispersion was stored in a polyethylene bottle. The dispersion was diluted to 10% solids and N-methyl pyrrolidone was adjusted to 2% for coating.

Example 2

Example 1 was repeated with a higher amount of silicone polycarbinol Q4-3667 as follows, 129.5 grams of Tone 0230 (0.208 eg), 35 grams of 2,2-bis(hydroxymethyl) propionic acid, 3.5 grams of 1,4-butanediol (0.078 eq), 35 grams of N-methyl pyrrolidone, 87.5 grams of Q4-3667 (0.077 eq), 136.5 grams of isophorone diisocyanate (1.22 eq), and 0.02 grams of T-9 catalyst. The prepolymer was found to have an equivalent weight of 702.4 and NCO:OH ratio of 1.9:1.

170 grams of the prepolymer was dispersed in a mixture of 450 grams of water, 5.73 grams of triethylamine, 6.1 grams of ethylene diamine (0.2 eq), and 4.25 grams of silane A-1100 (0.109 eq).

Example 3

(using 1,6-hexane diol adipate polyester as the long chain polyol)
Prepolymer Preparation:

A prepolymer was prepared as above by charging 173.9 gms (0.1704 eq) of Lexorez 1130–55 from Ionolex Corporation, 18.5 grams of 2,2-bis(hydroxymethyl) propionic acid (0.277 eq), 4.4 grams of 1,4-butanediol (0.0986 eq), 18.5 grams of Tone-0230 (0.0297 eq), 125 grams of isophorone diisocyanate (1.211 eq), 37.5 grams of N-methyl pyrrolidone, 0.04 grams of T-9, and 9.0 grams of Q4-3667 (0.0302 eq). The prepolymer was found to have an equivalent weight of 795.1 and a ratio NCO:OH of 1.85:1.

Dispersion Preparation:

160 grams of the prepolymer obtained was added to a mixture of 400 grams of water, 5.58 grams of triethylamine, 5.6 grams of ethylene diamine, and 3.0 grams of A-1100 as chain terminating agent. The resulting dispersion was stored in a polyethylene bottle and diluted to 5% solids, and N-methyl pyrrolidone was adjusted to 1% for coating.

Example 4
(using a mixture of polytetramethylene ether diol and a small quantity of polycaprolactone diol as the sole polyester or polyether polyol)

Prepolymer Preparation:

A prepolymer was prepared by charging 159.6 grams of Terathane-2000 (0.1595 eq), 18.9 grams of Tone-0230 (0.030 eq), 18.55 grams of 2,2-bis(hydroxymethyl) propionic acid (0.027 eq), 2.24 grams of 1,4-butanediol (0.049 eq), 35 grams of N-methyl pyrrolidone, 0.04 grams of T-9 catalyst, 127 grams of isophorone diisocyanate (1.139 eq), and 70.0 grams of Q4-3667 (0.0619 eq). The prepolymer was found to have an equivalent weight of 769.4 and a ratio NCO:OH of 1.97:1.

Dispersion Preparation:

175 grams of the prepolymer obtained was dispersed into a mixture of 450 grams of water, 5.84 grams of triethylamine, 5.6 grams of ethylene diamine, and 6.13 grams of A-1100. The resulting dispersion was stored in a polyethylene bottle. The dispersion was diluted to 10% solids and the N-methyl pyrrolidone was adjusted to 2.67%. 5 grams of CP 349W (a 20% water dispersed chlorinated polyolefin) per 100 grams of 10% solid dispersion was added.

Example 5

A prepolymer was prepared similarly to Example 4 from: 120.0 grams of Terathane-2000 (0.12 eq), 15.0 grams of Tone-0230 (0.024 eq), 15.9 grams of 2,2-bis(hydroxymethyl) propionic acid (0.24 eq), 1.95 grams of isophorone diisocyanate (0.043 eq), 30 grams of N-methyl pyrrolidone, 0.04 grams of T-9 catalyst, 106.5 grams of isophorone diisocyanate (0.955 eq), and 90 grams of Q4-3667 (0.0796 eq). The equivalent weight of the prepolymer was found to be 841.4 and the NCO:OH, was found to be 1.89:1.

150 grams of the above prepolymer was dispersed in a mixture of 380 grams of water, 4.74 grams of triethyl amine, 4.95 grams of ethylene diamine (0.165 eq) and 2.82 grams of silane A-1100 (0.0126 eq).

Example 6

A prepolymer was made according to Example 4 but omitting the Tone polyol, and incorporating a small amount of a triol chain extender. The following ingredients were used: 69.0 grams of Terathane-2000 (0.069 eq), 11.55 grams of 2,2-bis(hydroxymethyl) propionic acid (0.172 eq), 1.15 grams of isophorone diisocyanate (0.025 eq), 23 grams of N-methyl pyrrolidone, 0.02 grams of T-9 catalyst, 80.5 grams of isophorone diisocyanate (0.722 eq), 69 grams of silicone polycarbinol Q4-3667 (0.61 eq), and 2.3 grams of trimethylol propane (0.051 eq). The prepolymer was found to have an equivalent weight of 747 and NCO:OH ratio of 1.9:1.

The above prepolymer was dispersed in 380 grams of water, 5.07 grams of triethylamine, 5.1 grams of ethylene diamine (0.17 eq), and 2.82 grams of Silane A-1100 (0.0126).

Test Procedure:

A uniform coating of the dispersions was applied using a Knurl roll onto corona and flame treated 1.6 mil biaxially-oriented polypropylene film (BOPP). The solids content of the dispersions did not exceed 10 percent. After coating was completed, the films were then hot melt coated with a hot melt adhesive by applying 335 mg per 200 sq. cm of backing (4.0 grains) and slit to 20 yds×3 in rolls. The adhesive was a styrene-isoprene-styrene block copolymer/tackifier adhesive having 50 parts by weight of the block copolymer and 50 parts by weight of theced film as a release surface for pressure-sensitive adhesive tape was evaluated using the following test methods. The release, readhesions to BOPP and unwind were evaluated for examples 1, 3 and 4.

Unwind test: This describes the procedure for determining the unwind value of frontal diaper tapes either in wide or small roll form in grams per centimeter. An Instron machine was used for these tests. The initial release, adhesion and unwind of the low adhesion backsize coated tapes was measured in Instron in a 90° or 135° peel test according to Pressure Sensitive Tape Council test methods PSTC #5 and PSTC #8, respectively.

| Sample | Film Type | Unwind PSTC #* | Anchorage Frontal tape to Polyethylene *#5 90° peel | Release from tape 135° peel** g/cm |
|---|---|---|---|---|
| 1. | corona | 118.1 | 224.0 | 94.9 |
|  | Flame | 113.4 | 197.2 | 81.5 |
| 2. | corona | 66.1 | 2764 | 119.3 |
| 3. | corona | 106.3 | 298.4 | 98.8 |
|  | Flame | 129.1 | 278.7 | 98.8 |
| 4. | corona | 79.5 | 232.3 | 46.5 |
|  | Flame | 104.7 | 186.2 | 65.0 |
| Control | corona | 53.5 | 245.3 | 49.6 |
| 5. | Flame | 47.2 | 300.8 | 54.3 |
|  | corona | 87.0 | 355.1 | 117.7 |
| 6. | corona | 118.9 | 396.1 | 139.8 |
| Control | corona | 51.2 | 300.0 | 55.5 |

*This test was done to check whether the anchorage of low adhesion backsize was satisfactory.
**135° release test The control samples are for comparison purposes and are conventional solvent-borne urethane low adhesion backsize compositions having a 5% solid content (see U.S. Pat. No. 2,532,011).

The above samples have release values in the range of from about 40 g/cm to about 160 g/cm, within the "premium" range of releasability. The above samples demonstrate the wide range of release values which can be achieved with compositions of the invention.

I claim:

1. A water-soluble or water-dispersible polyurethane polymer whose polymer chain includes silicone-containing segments and whose polymer chain is end-capped with a single isocyanate-reactive silane group.

2. A polymer according to claim 1 which has water-solubilizing groups pendant from the polymer chain.

3. A polymer according to claim 1 wherein the polymer backbone contains units derived from a urethane prepolymer, which urethane prepolymer units are interlinked by a diamine chain extender.

4. A polymer according to claim 3 wherein the urethane prepolymer units are composed of polyisocyanate moieties alternating with hydroxy-containing moieties, the hydroxy-containing moieties being randomly distributed in the polymer chain and being derived from (i) a polyester polyol or a polyether polyol, (ii) a low molecular weight diol chain extender and (iii) silicone polycarbinol.

5. A polymer according to claim 4 wherein the said urethane prepolymer units have a molecular weight of from about 4,000 to about 8,000.

6. A polymer according to claim 4 wherein the said urethane prepolymer units have a molecular weight of from about 7,000 to about 8,000.

7. A polymer according to claim 4 which has a number average molecular weight in the range from about 20,000 to about 120,000.

8. A polymer according to claim 7 wherein the polyester polyol or polyether constitutes from about 20 to about 50% of the polymers, the low molecular weight diol chain extender plus the polyisocyanate together constitute from about 30 to about 45% of the polymer, the silicone polycarbinol constitutes from about 10 to about 50% of the polymer and the silane terminating agent constitutes from about 1 to 5% of the polymer.

9. A polymer according to claim 7 wherein the polyester polyol or polyether constitutes from about 30 to about 45% of the polymers, the low molecular weight diol chain extender plus the polyisocyanate together constitute from about 35 to about 40% of the polymer, the silicone polycarbinol constitutes from about 25 to about 35% of the polymer and the silane terminating agent constitutes from about 2 to 4% of the polymer.

10. A polymer according to claim 4 wherein the silicone polycarbinol is derived from a silicone diol of the formula

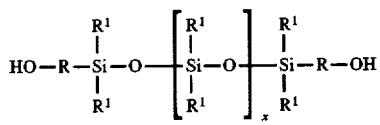

wherein R is a divalent group of up to about 60 atoms, the atom attached directly to the hydroxy group being a carbon atom, $R^1$ is a lower alkyl or a lower alkoxy group and x is an integer of from 2 to 30.

11. A polymer according to claim 10 wherein R is a poly(ethylenoxy) moiety containing about 12 ethylenoxy groups, $R_1$ is methyl and x is about 15.

12. A polymer according to claim 4 wherein the polyester polyol is a polycaprolactone polyol that has a molecular weight of from about 800 to about 4,000.

13. A polymer according to claim 4 wherein the polyester polyol is a polyester based on 1,6-hexanediol adipate that has a molecular weight of from about 1,000 to about 4,000.

14. A polymer according to claim 4 wherein the polyisocyanate is an aliphatic diisocyanate.

15. A polymer according to claim 4 wherein the polyisocyanate is isophorone diisocyanate.

16. A polymer according to claim 4 wherein the low molecular weight diol chain extender has a molecular weight below 200.

17. A polymer according to claim 4 wherein the low molecular weight diol chain extender is 1,4-butane-diol.

18. A polymer according to claim 4 wherein one of the hydroxy-containing moieties incorporated into the prepolymer is 2,2-bis(hydroxymethyl)propionic acid.

19. A polymer according to claim 4 wherein the diamine moieties interlinking the urethane are derived from diamine chain extenders of molecular weight less than 200.

20. A polymer according to claim 2 wherein the diamine moieties interlinking the urethane are derived from ethylene diamine.

21. A polymer according to claim 4 whose polymer chain is terminated by a chain terminating agent that is an omega-amino $C_{1-4}$ alkyl tri($C_{1-4}$ alkoxy) silane.

22. A polymer according to claim 21 wherein the chain terminating agent is gamma-aminopropyl triethoxy silane.

23. A process for preparing a water-soluble or water-dispersible polyurethane polymer which process comprises:

(a) preparing an isocyanate-terminated urethane prepolymer by reacting together a polyisocyanate, a polyester polyol or a polyether polyol, a low molecular weight diol chain extender and a silicone polycarbinol, and (b) reacting the isocyanate-terminated urethane prepolymer with a low molecular weight diamine chain extender and a single isocyanate reactive monoamine silane chain terminating agent.

24. A process according to claim 23 wherein in step (b) the isocyanate-terminated urethane prepolymer is introduced into an aqueous solution of the chain extender and the chain terminating agent, whereby there is formed an aqueous solution or dispersion of the polyurethane.

25. A process according to claim 24 wherein process step (a) is carried out in an organic solvent and the isocyanate-terminated urethane prepolymer in the organic solvent is added to the aqueous solution or dispersion of the chain extending agent and chain terminating agent.

26. A process according to claim 25 wherein the organic solvent is a solvent that is capable of serving as a coalescing agent in a low adhesion backsize composition.

27. A process according to claim 25 wherein the organic solvent is N-methyl pyrrolidone.

* * * * *